United States Patent
Naito et al.

(10) Patent No.: US 6,690,732 B2
(45) Date of Patent: Feb. 10, 2004

(54) SCENE CHARACTERISTICS DETECTION TYPE VIDEO ENCODING APPARATUS

(75) Inventors: Sei Naito, Saitama (JP); Shuichi Matsumoto, Tokyo (JP)

(73) Assignee: DDI Corporation, Tokyo (JP)

( * ) Notice: Subject to any disclaimer, the term of this patent is extended or adjusted under 35 U.S.C. 154(b) by 518 days.

(21) Appl. No.: 09/790,516

(22) Filed: Feb. 23, 2001

(65) Prior Publication Data

US 2001/0019588 A1 Sep. 6, 2001

(30) Foreign Application Priority Data

Mar. 6, 2000 (JP) .......................................... 2000-060539

(51) Int. Cl.[7] ................................................. H04N 7/32
(52) U.S. Cl. ............................ 375/240.24; 375/240.12; 375/240.29; 348/700
(58) Field of Search ...................... 348/700; 375/240.24, 375/240.12, 240.29

(56) References Cited

U.S. PATENT DOCUMENTS 5,459,517 A  * 10/1995  Kunitake et al. ...... 375/240.13

* cited by examiner

*Primary Examiner*—Howard Britton
(74) *Attorney, Agent, or Firm*—Westerman, Hattori, Daniels & Adrian, LLP

(57) ABSTRACT

A scene characteristics detection type motion video encoding apparatus is provided for minimizing the degradation of picture quality derived from the point of scene change. The filtering characteristic (namely a filter factor) of a spatiotemporal filter is updated in response to the scene attribute data (a) received from a scene change point detector and the encoding difficulty data (b) received from an encoding difficulty estimator. Accordingly, when the encoding difficulty is high, high frequency components of the input video signal are eliminated. A rate controller determines the target amount of data to be encoded using scene attribute data (a) and the encoding difficulty data (b). When the point of scene change is detected, the target amount of data to be encoded for the input video signal which is distanced by a given distance from the point of scene change is weighted for matching with the encoding difficulty by a weighting factor $W_{sc}$ (>1.0). As a result, the number of bits allocated to the input video signal can be increased thus minimizing the degradation of picture quality derived from the point of scene change.

8 Claims, 4 Drawing Sheets

SCENE CHARACTERISTICS DETECTION TYPE VIDEO ENCODING APPARATUS

BACKGROUND OF THE INVENTION

1. Field of the Invention

The present invention relates to a scene characteristics detection type video encoding apparatus capable of minimizing the degradation of picture quality derived from a scene change (a point of scene change).

2. Description of the Related Art

One of such conventional apparatuses is a video encoding apparatus, such as an MPEG2 encoder, accompanied with a TM5 (Test Model 5) oriented virtual buffer controller. In the apparatus, when a difference occurs between the target amount and the generated amount of data to be encoded, it is fed back for controlling a quantization accuracy. This allows the quantizing process to be stably carried out with the allocation of bits to an input video signal to be encoded determined corresponding to the encoding difficulty of the input video signal which may be varied more or less.

However, when the input video signal has two consecutive images appearing less correlated to each other such as before and after the point of scene change, a different between the generated amount of data and the target amount of data may increase. The different between the generated amount of data and the target amount of data is fed back to a process of determining the quantization accuracy due to a large change in the virtual buffer occupancy, thus causing an abrupt picture quality degradation in the beginning of a scene.

SUMMARY OF THE INVENTION

It is an object of the present invention to provide a scene characteristics detection type video encoding apparatus which can eliminate the foregoing disadvantage of a prior art and minimize the degradation of picture quality derived from the point of scene change.

In order to achieve the object, the present invention is characterized in comprising a means for detecting the point of scene change in an input video signal and releasing a scene attribute data including at least a data of a position distanced from the point of scene change; a means for estimating the encoding difficulty of the input video signal; and a means for determining the amount of data to be encoded for the input video signal in response to the scene attribute data and the encoding difficulty, wherein the means for determining the amount of data to be encoded for the input video signal is arranged for allocating a more number of bits to the input video signal which is close to the point of scene change. This allows the degradation of picture quality derived from the point of scene change to be minimized.

As the second feature of the present invention, a filtering means for pre-processing an input video signal prior to the encoding is provided and its filtering characteristic is updated in response to the scene attribute data and the encoding difficulty data. Accordingly, when the input video signal includes the point of scene change and its encoding difficulty is high, the filtering characteristic of the filtering means is updated for effectively eliminating high frequency components of the input video signal. This allows a more number of bits to be allocated to low frequency components of the input video signal which largely affect the subjective picture quality, hence minimizing the degradation of the picture quality.

DETAILED DESCRIPTION OF THE PREFERRED EMBODIMENTS

Figure 1:
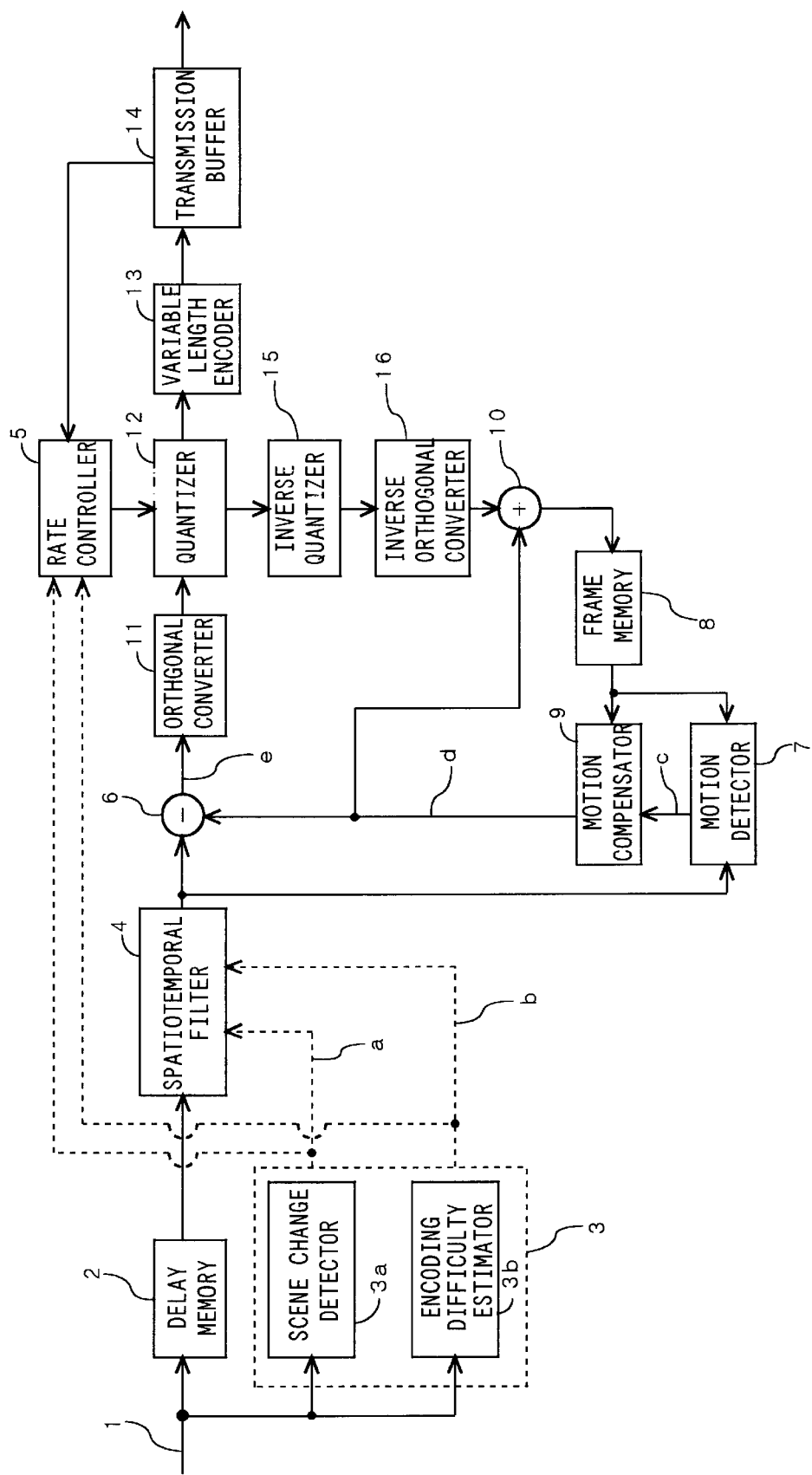
FIG. 1 is a block diagram schematically showing an apparatus of an embodiment of the present invention.

The present invention will be described in more detail referring to the relevant drawings. FIG. 1 is a block diagram of an apparatus showing one embodiment of the present invention.

An input video signal 1 is inputted by a delay memory 2 and a scene characteristics analyzer 3 which are connected in parallel to each other. The delay memory 2 delays the input video signal 1 by time equivalent to a duration when the input video signal 1 is processed in the scene characteristics analyzer 3. The scene characteristics analyzer 3 comprises a scene change detector 3a and an encoding difficulty estimator 3b which both may be implemented by known components. The encoding difficulty may be expressed by a variance of the luminance in a block determined for (a frame of) the input video signal. The higher the variance, the greater the encoding difficulty becomes. The scene change detector 3a releases a scene attribute output (a) indicative of the change point of each scene while the encoding difficulty estimator 3b releases an encoding difficulty output (b). The two outputs (a) and (b) are then transferred to a spatiotemporal filter 4 and a rate controller 5.

Figure 2:
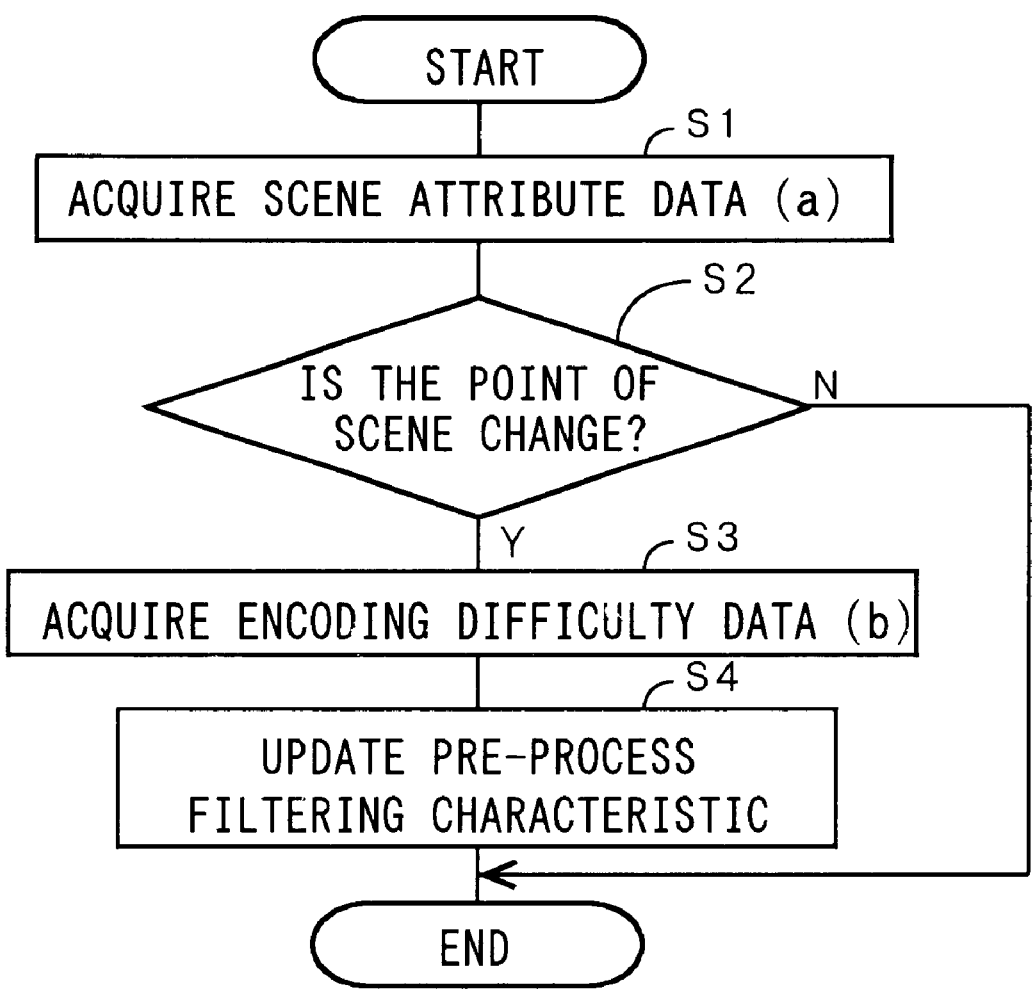
FIG. 2 is a flowchart of processing operation of a spatiotemporal filter shown in FIG. 1.

As shown in FIG. 2, the spatiotemporal filter 4 receives the scene attribute data (a) (Step S1) and when finding a scene change point from the scene attribute data (a) (i.e. it is judged "yes" at Step S2), calls the encoding difficulty data (b) (Step S3). This is followed by updating the filtering characteristic or filter factor in response to the encoding difficulty data (b). More particularly, when the encoding difficulty is high, the filtering characteristic of the filter 4 is updated so that more high frequencies or a wider range of high frequencies are cut off.

The input video signal filtered by the spatiotemporal filter 4 is then transferred to a predictive signal subtracter 6 and a motion detector 7. The motion detector 7 detects a motion vector (c) from the input video signal and its reference signal received from a frame memory 8. The motion vector (c) is further transmitted to a motion compensator 9. The motion compensator 9 extracts a signal designated by the motion vector (c) from a frame memory 8 and transmits it as a motion compensation predictive signal (d) to the predictive signal subtracter 6 and a local decoding adder 10.

The predictive signal subtracter 6 subtracts the motion compensation predictive signal (d) from the input video signal to generate and release a prediction error signal (e). The prediction error signal (e) is subjected to orthogonal transformation such as DCT (discrete cosign transform) in an orthogonal converter 11 for increasing the efficiency of the encoding process. A resultant transformed output is transferred to a quantizer 12. As the operation of the quantizer 12 is governed by bit allocation of the rate controller 5, it will be explained later. The quantized signal from the quantizer 12 is then converted into a variable-length code such a Huffman code by a variable-length encoder 13. The encoded signal is temporarily saved in a transmission buffer 14 before dispatched to a network. As the predictive signal is identical to that of the decoding side, the quantized factor in the quantizer 12 is inverse quantized by an inverse quantizer 15 and transferred to an inverse orthogonal converter 16 where the prediction error signal is locally decoded. The prediction error signal is added with the motion compensation predictive signal (d) by the local decoding adder 10 and a resultant sum signal is saved in the frame memory 8.

Figure 3:
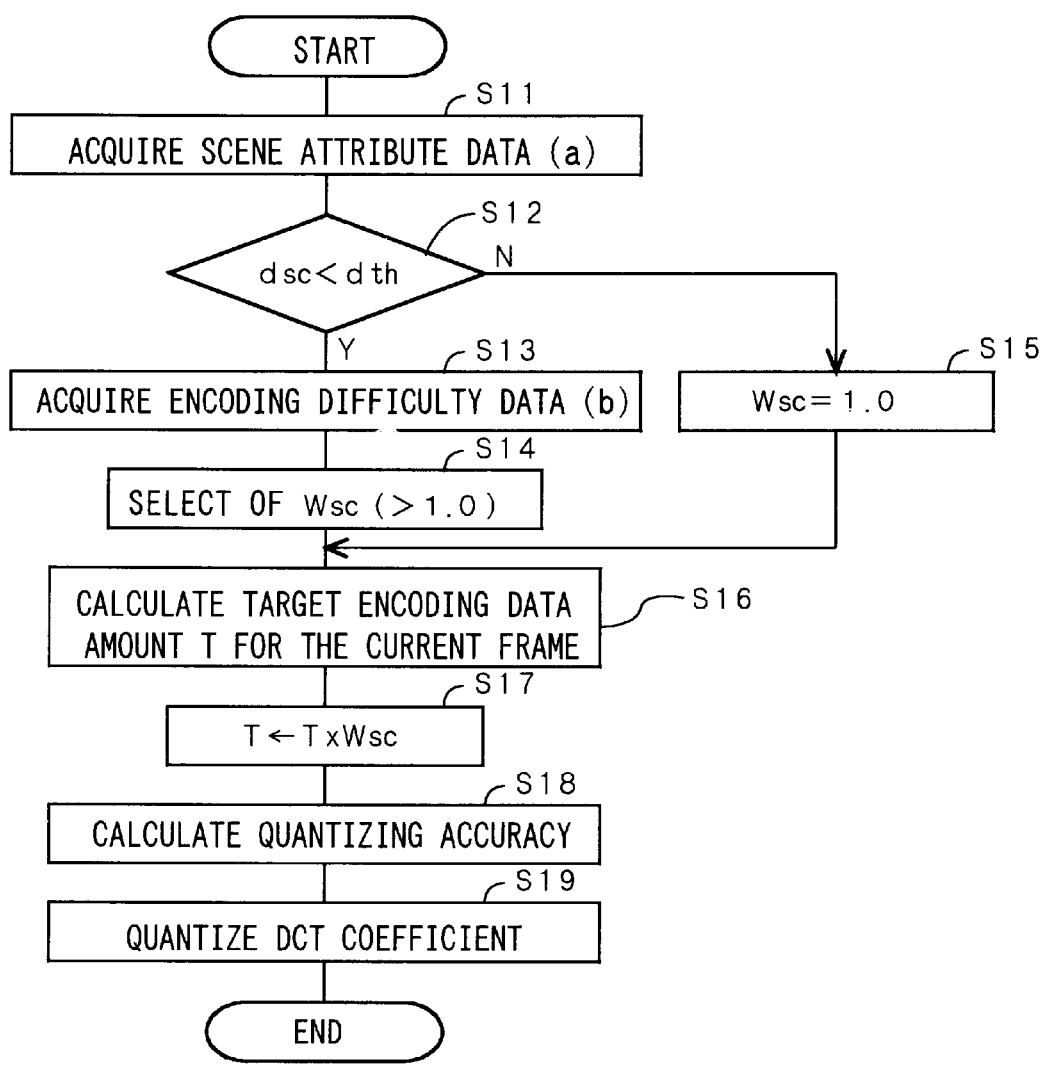
FIG. 3 is a flowchart of processing operation of a rate controller shown in FIG. 1.

The function of the rate controller 5 will now be explained referring to a flowchart of FIG. 3. The flowchart starts with Step S11 where the rate controller 5 receives the scene attribute data (a). It is then examined at Step S12 whether or not the distance $d_{sc}$ of the input video signal 1 from the point of scene change is smaller than a predetermined threshold $d_{th}$. When the distance $d_{sc}$ is smaller than the threshold $d_{th}$, i.e. the input video signal is close to the point of scene change, the procedure goes to Step S13 for acquiring the encoding difficulty (b). At Step S14, the weighting factor $W_{sc}$ (>1.0) for the target amount of data to be encoded is determined corresponding to the encoding difficulty (b). When it is judged "not" at Step S12, the procedure goes to Step S15 where the weighting factor $W_{sc}$ for the target amount of data to be encoded is set to 1.0.

This is followed by Step S16 where the target encoding data amount T for a selected frame in the input video signal is calculated. The target encoding data amount T may be calculated by any known technique. At Step S17, the product $T \times W_{sc}$ of the target encoding data amount T and the weighting factor $W_{sc}$ is assigned as a new target amount of data to be encoded. Remember that $W_{sc}$ is the weighting factor for the target amount of data to be encoded. Accordingly, when the input video signal is close to the point of scene change, the target encoding data amount is set to a greater value. At Step S18, the target encoding data amount T calculated at Step S17 is used for determining the accuracy of quantization or the step size of quantization. At Step S19, the quantizer 12 quantizes the DCT coefficient using the quantization accuracy received from the rate controller 5.

This embodiment of the present invention allows a greater value of the target encoding data amount T to be allocated to the input video signal which is closer to the point of scene change. Therefore, since the input video signal close to the point of scene change is processed over a greater number of bits, its picture quality degradation at the point of scene change can be minimized. Also, as the point of scene change and the encoding difficulty are determined prior to the encoding process, an optimum number of bits can be allocated to the frame just after the point of scene change so that the frame is slightly higher in the picture quality than the previous frames. This will guarantee that the frame after the point of scene change remains consistent in the picture quality. Simultaneously, the number of bits allocated to the succeeding frame to be encoded will be reserved thus avoiding the degradation of the picture quality of the succeeding frame.

As set forth above, the present invention permits the amount of data to be encoded (the number of bits) to be favorably determined corresponding to a change in the scene characteristics of video data, hence eliminating temporal degradation of the picture quality which is commonly encountered at every point of scene change in a conventional video encoding process.

In addition, as the filtering characteristic of a pre-process filter which is the spatiotemporal filter 4 in the embodiment is adaptively determined, high frequency components in the input video signal can efficiently be eliminated while low frequency components which largely determine the subjective picture quality are saved and assigned with a more amount of data to be encoded. Accordingly, the degradation of the picture quality will be minimized.

Figure 4A:
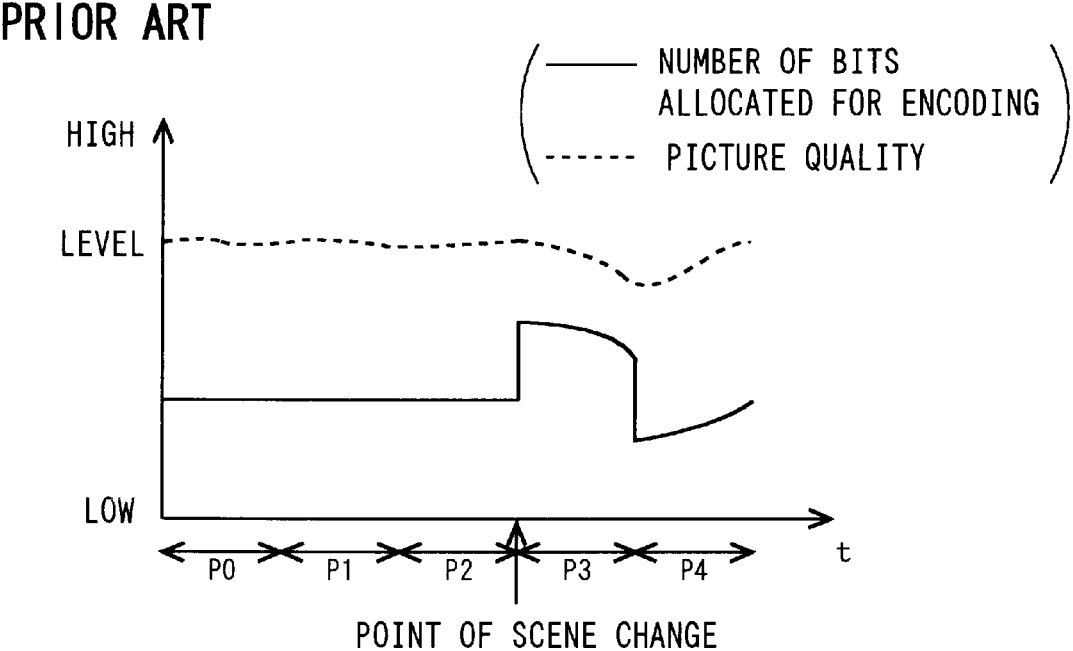
FIG. 4 illustrates a difference in both the allocated bit number and the picture quality between a conventional apparatus and an apparatus according to the present invention.
Figure 4B:
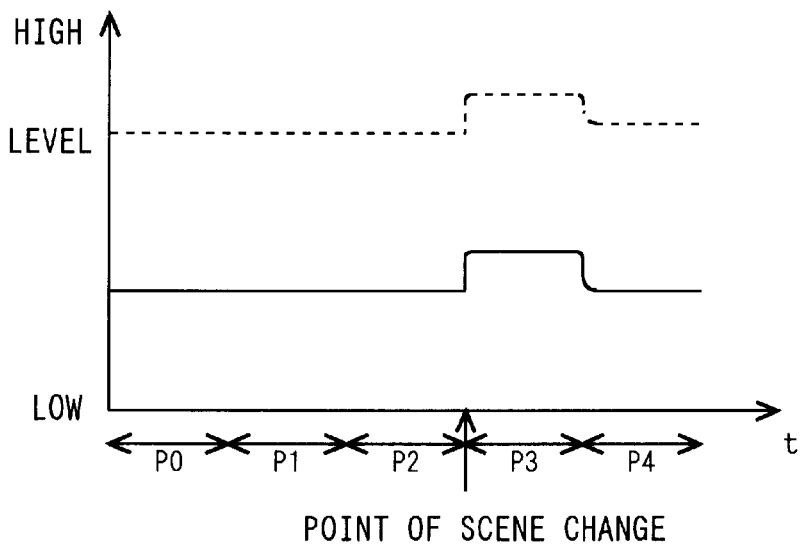

FIG. 4 illustrates the number of bits allocated for encoding and the quality of picture before and after the point of scene change in a conventional apparatus (FIG. 4A) and the apparatus of the present invention (FIG. 4B). The horizontal axis represents the time t while the vertical axis is the level. Frames (or picture) are expressed by P0, P1, P2 . . . along the horizontal axis. In the conventional apparatus shown in FIG. 4A, the frame P3 just after the point of scene change fails to have a proper level of the picture quality and the following frame P4 is definitely declined in the picture quality. In the apparatus of the present invention shown in FIG. 4B, the frame P3 just after the point of scene change remains stable in the picture quality and the following frames also show no degradation of the picture quality.

More particularly, the conventional apparatus subjects the frame just after the point of scene change to the intra-frame encoding with the rate control remaining equal to that of the other frames, hence causing the generated amount of data to be encode to be greater than the target encoding data amount. As a result, the frame P3 just after the point of scene change fails to stay stable in the picture quality and dominates a more number of bits in the encoding, thus introducing the picture quality degradation for an extended duration.

The apparatus of the present invention detects the point of scene change and the encoding difficulty prior to the encoding process and allocates an optimum number of bits to the frame just after the point of scene change so that the frame is slightly higher in the picture quality than the previous frames. Accordingly, while the frame P3 just after the point of scene change remains unchanged in the picture quality, the number of bits allocated to the succeeding frames can be reserved with the prediction gain achieved by the improved picture quality of succeeding frames. In other words, the succeeding frames can be avoided from abrupt picture quality degradation.

What is claimed is:

1. A scene characteristics detection type video encoding apparatus comprising:
    a means for detecting the point of scene change in an input video signal and releasing a scene attribute data including at least a data of a position distanced from the point of scene change;
    a means for estimating the encoding difficulty of the input video signal; and
    a means for determining the amount of data to be encoded for the input video signal in response to the scene attribute data and the encoding difficulty, wherein the means for determining the amount of data to be encoded for the input video signal is arranged for allocating a more number of bits to the input video signal which is close to the point of scene change.

2. A scene characteristics detection type video encoding apparatus according to claim 1, wherein the means for estimating the encoding difficulty is arranged for determining the encoding difficulty from an average variance of the luminance in blocks calculated from the input video signal so that a more number of bits are allocated to the input video signal when the average variance of the luminance in blocks is higher.

3. A scene characteristics detection type video encoding apparatus according to claim 1, wherein the means for determining the amount of data to be encoded for the input video signal conducts the allocation of bits on the basis of a macroblock.

4. A scene characteristics detection type video encoding apparatus according to claim 2, wherein the means for determining the amount of data to be encoded for the input video signal conducts the allocation of bits on the basis of a macroblock.

5. A scene characteristics detection type video encoding apparatus comprising:

a means for detecting the point of scene change in an input video signal and releasing a scene attribute data including at least a data of a position distanced from the point of scene change;

a means for estimating the encoding difficulty of the input video signal; and a filtering means for pre-processing the input video signal, wherein the filtering characteristic of the filtering means for the input video signal is updated in response to the scene attribute data and the encoding difficulty.

6. A scene characteristics detection type video encoding apparatus according to claim 4, wherein the filtering characteristic of the filtering means is updated so that the cutting off of high frequency components of the input video signal is increased in the effectiveness when the encoding difficulty of the input video signal at the point of scene change is higher.

7. A scene characteristics detection type video encoding apparatus according to claim 5, wherein the means for estimating the encoding difficulty is arranged for determining the encoding difficulty from an average variance of the luminance in blocks calculated from the input video signal, and the filtering characteristic of the filtering means is updated so that the cutting off of high frequency components of the input video signal is increased in the effectiveness when the average variance of the luminance in blocks is higher.

8. A scene characteristics detection type video encoding apparatus comprising:

a means for detecting the point of scene change in an input video signal and releasing a scene attribute data;

a means for estimating the encoding difficulty of the input video signal;

a filtering means for pre-processing the input video signal; and a means for determining the amount of data to be encoded for the input video signal in response to the scene attribute data and the encoding difficulty, wherein the filtering characteristic of the filtering means is updated so that the cutting off of high frequency components of the input video signal at the point of scene change is increased in the effectiveness, and the means for determining the amount of data to be encoded for the input video signal is arranged for allocating a more number of bits to the input video signal which is close to the point of scene change.

* * * * *